US010697540B2

(12) United States Patent
Kawamoto et al.

(10) Patent No.: US 10,697,540 B2
(45) Date of Patent: Jun. 30, 2020

(54) VEHICLE CONTROL DEVICE AND VEHICLE CONTROL METHOD

(71) Applicants: JATCO Ltd, Fuji, Shizuoka (JP); NISSAN MOTOR CO., LTD., Yokohama, Kanagawa (JP)

(72) Inventors: Yoshinobu Kawamoto, Seoul (KR); Seiichirou Takahashi, Isehara (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 190 days.

(21) Appl. No.: 15/757,850

(22) PCT Filed: Sep. 6, 2016

(86) PCT No.: PCT/JP2016/076130
§ 371 (c)(1),
(2) Date: Mar. 6, 2018

(87) PCT Pub. No.: WO2017/043473
PCT Pub. Date: Mar. 16, 2017

(65) Prior Publication Data
US 2018/0355970 A1    Dec. 13, 2018

(30) Foreign Application Priority Data
Sep. 10, 2015  (JP) ................. 2015-178428

(51) Int. Cl.
*F16H 61/662* (2006.01)
*F16H 61/02* (2006.01)
(Continued)

(52) U.S. Cl.
CPC ..... *F16H 61/66259* (2013.01); *B60W 10/023* (2013.01); *B60W 10/06* (2013.01);
(Continued)

(58) Field of Classification Search
CPC ........... F16H 61/66259; F16H 61/0213; F16H 2061/0485; F16H 2061/0488;
(Continued)

(56) References Cited

U.S. PATENT DOCUMENTS 7,815,545 B2 * 10/2010 Nakashima ........... B60W 10/02
477/138
8,282,529 B2 * 10/2012 Funakoshi .......... F16H 61/0021
477/180
8,983,703 B2 * 3/2015 Akebono ................ B60K 6/48
701/22

FOREIGN PATENT DOCUMENTS

JP    2008-039027 A    2/2008
JP    2010-180892 A    8/2010
(Continued)

Primary Examiner — Tinh Dang
(74) Attorney, Agent, or Firm — Foley & Lardner LLP

(57) ABSTRACT

A vehicle control device for controlling a vehicle including a variator provided in a power transmission path between a driving source and a driving wheel of a vehicle and a friction engaging element provided between the variator and the driving wheel, engaged when a running range is selected, while disengaged when a non-running range is selected and shutting off transmission of power through the power transmission path is provided. In this embodiment, an operating state of the vehicle is detected, a target speed ratio of the variator according to the operating state of the vehicle is set, if an actual speed ratio of the variator is smaller than the target speed ratio, shifting control of lowering a supply hydraulic pressure to a primary pulley of the variator and increasing the speed ratio of the variator is executed, and when the selection is switched from the non-running range to the running range during execution of the shifting control, lowering of the supply hydraulic pressure to the primary pulley after the switching is regulated.

11 Claims, 5 Drawing Sheets

(51) Int. Cl.
*B60W 10/02* (2006.01)
*B60W 10/06* (2006.01)
*B60W 10/08* (2006.01)
*B60W 10/107* (2012.01)
*B60W 20/30* (2016.01)
*B60W 30/18* (2012.01)
*F16H 61/04* (2006.01)
*F16H 61/66* (2006.01)

(52) U.S. Cl.
CPC .......... *B60W 10/08* (2013.01); *B60W 10/107* (2013.01); *B60W 20/30* (2013.01); *B60W 30/18054* (2013.01); *F16H 61/0213* (2013.01); *B60W 2540/10* (2013.01); *B60W 2710/083* (2013.01); *F16H 2061/0485* (2013.01); *F16H 2061/0488* (2013.01); *F16H 2061/6614* (2013.01)

(58) Field of Classification Search
CPC .......... F16H 2061/6614; B60W 10/06; B60W 10/08; B60W 10/023; B60W 10/107; B60W 20/30; B60W 30/18054; B60W 61/0213; B60W 2540/10; B60W 2710/083

See application file for complete search history.

(56) References Cited

FOREIGN PATENT DOCUMENTS

| | | |
|---|---|---|
| JP | 2012-247024 A | 12/2012 |
| JP | 2015-135165 A | 7/2015 |
| WO | WO-2013/128753 A1 | 9/2013 |

\* cited by examiner

VEHICLE CONTROL DEVICE AND VEHICLE CONTROL METHOD

TECHNICAL FIELD

The present invention relates to a vehicle control device and a vehicle control method which execute down-shift in conjunction with a change of a shift range.

BACKGROUND ART

JP2012-247024 discloses the one in a vehicle including a variator that when a speed ratio of the variator is not a speed ratio on the Lowest side (hereinafter referred to as a "Lowest speed ratio") at stop, the speed ratio is changed to the Lowest speed ratio after the stop. When the speed ratio is changed to the Lowest speed ratio, a hydraulic pressure is discharged from a primary pulley of the variator so as to lower a primary pulley pressure.

SUMMARY OF INVENTION

In a vehicle including a friction engaging element between the variator and a driving wheel (a forward/reverse switching mechanism or a sub-transmission mechanism, for example), the speed ratio of the variator is changed to the Lowest speed ratio and the friction engaging element in a disengaged state is engaged in accordance with a range change of a shift lever or the like, belt slip can occur in the variator due to an input of an inertia torque from the driving wheel side.

Specifically, in a vehicle including a sub-transmission mechanism as the friction engaging element, when the vehicle is stopped before the speed ratio becomes the Lowest speed ratio and moreover, a shift lever is changed from a D (drive) range to an R (reverse) range via an N (neutral) range after the stop, the friction engaging element for forward running in the engaged state is disengaged by the range change to the N (neutral) range. By means of the disengagement of the friction engaging element, each pulley in the variator is rotated by the torque transmitted from an engine, and a shaft of the friction engaging element on the variator side is also rotated. On the other hand, a shaft of the friction engaging element on the driving wheel side is not rotated since the vehicle is stopped. Therefore, in the friction engaging element, a rotation speed difference occurs between an input and output shafts.

In the variator, the speed ratio can be changed by rotation of each pulley. Thus, control of the speed ratio toward the Lowest speed ratio is started, and the primary pulley pressure is lowered.

If a range change to the R range is performed in such a state, and a friction engaging element for reverse running starts engagement, a torque (inertia torque) according to the rotation speed difference between the input and output shafts of the friction engaging element for reverse running is input to the variator not only from the engine side but also from the driving wheel side. Therefore, to the variator, the torque is input both from the engine and the driving wheel. If such torque is input when the speed ratio of the variator is being changed toward the Lowest speed ratio, that is, when the primary pulley pressure is being lowered, a belt gripping force with respect to the input torque is insufficient in the primary pulley, and the belt slip occurs.

Such belt slip can also occur not only during stop but when the shift lever is changed from the D range to the R range in a state where the speed ratio of the variator is still on a High side rather than a target speed ratio after sudden deceleration from a middle or a high vehicle speed to a low vehicle speed, for example. Moreover, it can occur not only in range switching to a different running range but when the shift lever is changed between the same running range (D range, for example) via a non-running range.

According to an aspect of the present invention, a vehicle control device adapted to control a vehicle including a variator provided in a power transmission path between a driving source and a driving wheel of a vehicle; and a friction engaging element provided between the variator and the driving wheel, engaged when a running range is selected, while disengaged when a non-running range is selected and shutting off transmission of power through the power transmission path, is provided. In this aspect, an operating state of the vehicle is detected; a target speed ratio of the variator according to the operating state of the vehicle is set; if an actual speed ratio of the variator is smaller than the target speed ratio, shifting control of lowering a supply hydraulic pressure to a primary pulley of the variator and increasing the speed ratio of the variator is executed; and when the shifting range is switched from the non-running range to the running range during execution of the shifting control, lowering of the supply hydraulic pressure to the primary pulley after the switching is regulated.

According to another aspect of the present invention, a vehicle control method for a vehicle including a variator provided in a power transmission path between a driving source and a driving wheel of the vehicle; and a friction engaging element provided between the variator and the driving wheel, engaged when a running range is selected, while disengaged when a non-running range is selected and shutting off transmission of power through the power transmission path. In this aspect, the vehicle control method includes detecting an operating state of the vehicle; setting a target speed ratio of the variator according to the operating state of the vehicle; if an actual speed ratio of the variator is smaller than the target speed ratio, executing shifting control of lowering a supply hydraulic pressure to a primary pulley of the variator and increasing the speed ratio of the variator; and when the shifting range is switched from the non-running range to the running range during execution of the shifting control, regulating lowering of the supply hydraulic pressure to the primary pulley after the switching.

According to the aforementioned aspect, when the friction engaging element in the disengaged state is to be engaged during down-shift of the variator, occurrence of the belt slip in the variator can be suppressed.

DESCRIPTION OF EMBODIMENTS

Hereinafter, an embodiment of the present invention will be described by referring to the attached drawings.

In the following description, a "speed ratio" is a value (=N1/N2) obtained by dividing an input rotation speed N1 of a transmission mechanism by an output rotation speed N2 of the transmission mechanism, and if the speed ratio is large, it is referred to be "on a Low side", while if the speed ratio is small, it is referred to be "on a High side". Moreover, shifting in which the speed ratio is changed from a current state to a Low side is referred to as down-shift, while shifting to be changed to the High side is referred to as up-shift.

Figure 1:
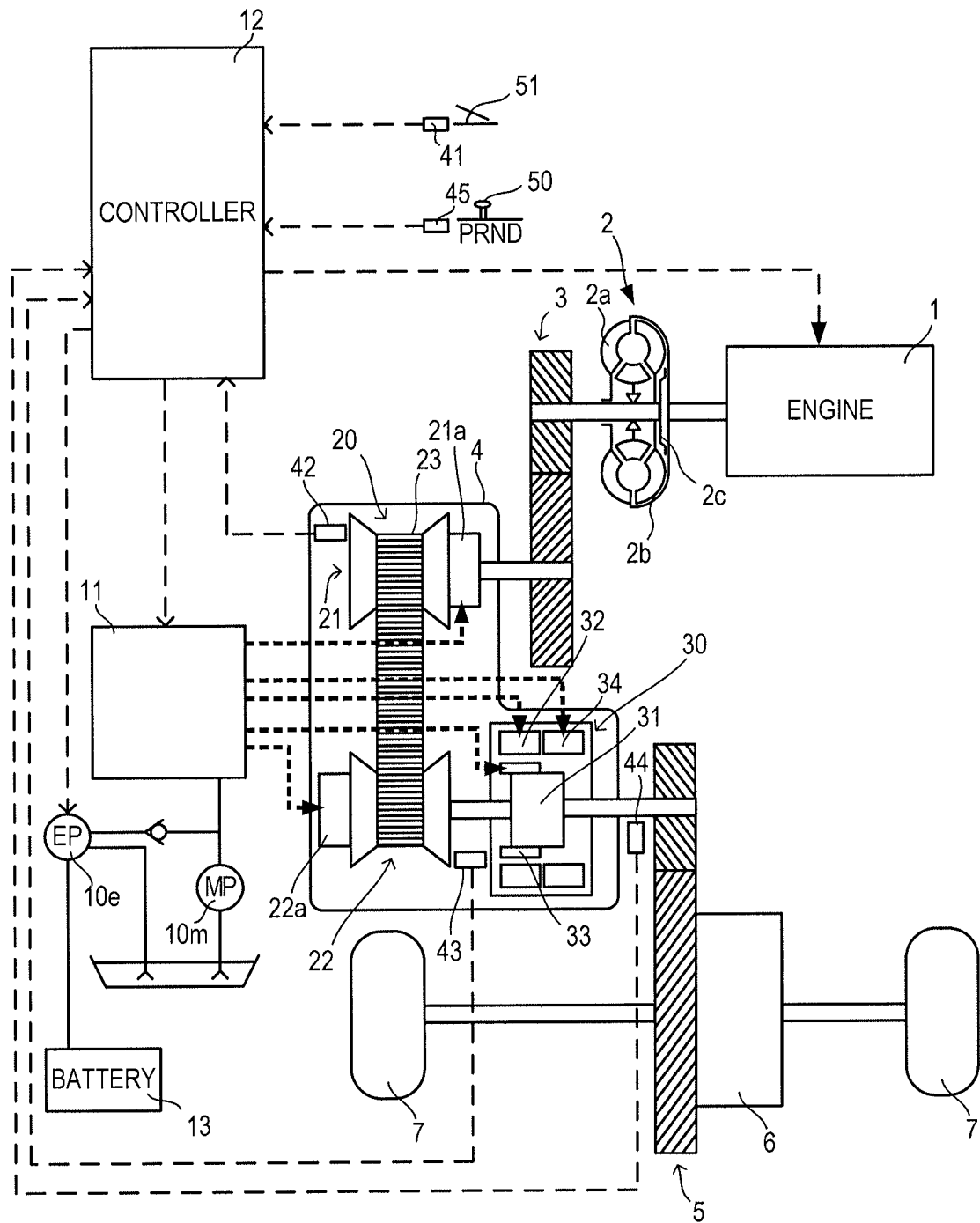
FIG. 1 is an outline configuration diagram of a vehicle according to an embodiment of the present invention.

FIG. 1 is an outline configuration diagram of a vehicle according to an embodiment of the present invention. This vehicle includes an internal combustion engine (hereinafter, referred to simply as an "engine") as a driving source, and a rotation power of the engine 1 is input into a pump impeller 2a of a torque converter 2 including a lockup clutch 2c through its output shaft and is transmitted to driving wheels 7 from a turbine runner 2b through a first gear train 3, a transmission mechanism 4, a second gear train 5, and a differential device 6.

Into the transmission mechanism 4, the rotation power of the engine 1, that is, a torque is input, and a mechanical oil pump 10m driven by using a part of the power of the engine 1 and an electric oil pump 10e driven by receiving power supply from a battery 13 are provided. Moreover, in the transmission mechanism 4, a hydraulic control circuit 11 for adjusting a pressure of an oil discharged from the mechanical oil pump 10m or the electric oil pump 10e, generating a required operating hydraulic pressure, and supplying it to each portion of the transmission mechanism 4 is provided.

The transmission mechanism 4 includes a belt continuously variable transmission mechanism (hereinafter referred to as a "variator") 20 and a sub-transmission mechanism 30 provided in series with the variator 20. The phrase "provided in series" here means that the variator 20 and the sub-transmission mechanism 30 are arranged on the same power transmission path from the engine 1 to the driving wheels 7. The sub-transmission mechanism 30 may be directly connected to an output shaft of the variator 20 as in this embodiment or may be connected through the other transmission or power transmission mechanism (a gear train, for example).

The variator 20 includes a primary pulley 21, a secondary pulley 22, and a V-belt 23 wound between each of the pulleys 21 and 22. In the variator 20, a width of a V-groove is changed in accordance with a hydraulic pressure supplied to a primary pulley oil chamber 21a (hereinafter referred to as a "primary pulley pressure") Ppri and a hydraulic pressure supplied to a secondary pulley oil chamber 22a (hereinafter referred to as a "secondary pulley pressure") Psec, whereby a contact radius between a V-belt 23 and each of the pulleys 21 and 22 changes, and a speed ratio Iva of the variator 20 variably changes continuously.

The sub-transmission mechanism 30 is a transmission mechanism having two forward gear positions and one reverse gear position. The sub-transmission mechanism 30 includes a Ravigneaux planetary gear mechanism 31 composed by connecting carriers of two planetary gears and a plurality of friction engaging elements (a Low brake 32, a High clutch 33, a Rev brake 34) connected to a plurality of rotation elements constituting the Ravigneaux planetary gear mechanism 31 and changing their linkage states. By adjusting a hydraulic pressure supplied to each of the friction engaging elements 32 to 34 and by changing engaged and disengaged states of each of the friction engaging elements 32 to 34, the speed ratio Is of the sub-transmission mechanism 30 can be changed. Here, the Low brake 32 corresponds to a "first friction engaging element" according to this embodiment, and the Rev brake 34 to a "second friction engaging element", respectively.

Specifically, when the Low brake 32 is engaged, and when the High clutch 33 and the Rev brake 34 are disengaged, the gear position of the sub-transmission mechanism 30 becomes a first-speed position. When the High clutch 33 is engaged, and when the Low brake 32 and the Rev brake 34 are disengaged, the gear position of the sub-transmission mechanism 30 becomes a second-speed position with a speed ratio smaller than that of the first-speed position. Moreover, when the Rev brake 34 is engaged, and when the Low brake 32 and the High clutch 33 are disengaged, the gear position of the sub-transmission mechanism 30 becomes a reverse position.

By changing the speed ratio Iva of the variator 20 and the speed ratio Is of the sub-transmission mechanism 30, a speed ratio I of the entire transmission mechanism 4 is changed.

Figure 2:
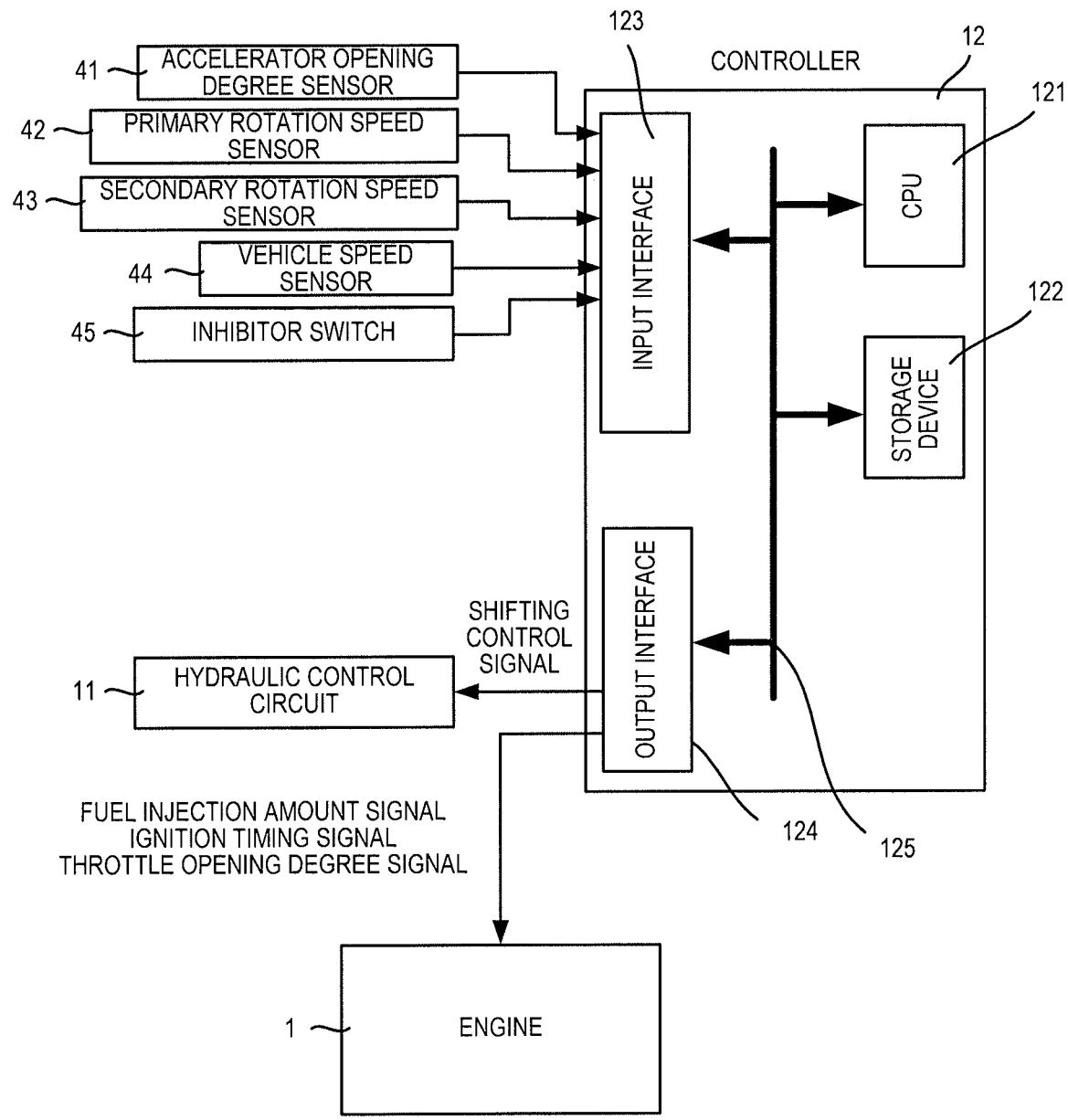
FIG. 2 is an outline configuration diagram of a controller according to the embodiment.

A controller 12 is the controller 12 for comprehensively controlling operations of the engine 1 and the transmission mechanism 4, and as illustrated in FIG. 2, it is constituted by a CPU 121, a storage device 122 made of a RAM and a ROM, an input interface 123, an output interface 124, and a bus 125 mutually connecting them. The controller 12 constitutes a "control device" according to this embodiment.

Into the input interface 123, as signals indicating an actual operating state of the engine 1 and the automatic transmission, an output signal of an accelerator pedal opening sensor 41 for detecting an accelerator pedal opening APO which is an operation amount of an accelerator pedal 51 by a driver, an output signal of a primary rotation speed sensor 42 for detecting a primary pulley rotation speed Npri which is a rotation speed of the primary pulley 21, an output signal of a secondary rotation speed sensor 43 for detecting a secondary pulley rotation speed Nsec which is a rotation speed of the secondary pulley 22, an output signal of a vehicle speed sensor 44 for detecting a vehicle speed VSP, an output signal of an inhibitor switch 45 for detecting a position of a shift lever 50 and the like are input. Other than the above, into the controller 12, an output signal of an engine rotation speed sensor for detecting an engine rotation speed Ne which is a rotation speed of an output shaft of the engine 1, an output signal of a turbine rotation speed sensor for detecting a turbine rotation speed Nt which is a rotation speed of an output shaft of a torque converter 2, an output signal from a brake liquid pressure sensor for detecting a brake liquid pressure BRP corresponding to an operation amount of a brake pedal and the like are input through the input interface 123.

In the storage device 122, a control program of the engine 1, a shifting control program of the transmission mechanism 4, various maps and tables used in these programs are stored. The CPU 121 reads out and executes the program stored in the storage device 122, applies various types of arithmetic processing to the various signals input through the input interface 123, generates a fuel injection amount signal, an ignition timing signal, a throttle opening degree signal, and a shifting control signal and outputs the generated signals to the engine 1 and the hydraulic control circuit 11 through the output interface 124. Various values and their calculation results used by the CPU 121 in the arithmetic processing are stored in the storage device 122 as appropriate.

The hydraulic control circuit 11 is constituted by a plurality of channels and a plurality of hydraulic control valves. The hydraulic control circuit 11 switches a supply path of the hydraulic pressure by controlling the plurality of hydraulic control valves on the basis of the shifting control signal from the controller 12, adjusts the required operating hydraulic pressure from the pressure of the oil discharged from the mechanical oil pump 10m or the electric oil pump 10e and supplies this operating hydraulic pressure to each portion of the transmission mechanism 4. As a result, the speed ratio Iva of the variator 20 and the speed ratio Is of the sub-transmission mechanism 30 are changed, and shifting of the transmission mechanism 4 is performed.

In this embodiment, the speed ratio of the variator 20 is changed toward the Lowest speed ratio during stop, and the hydraulic control of the primary pulley 21 described below is executed. The hydraulic control according to this embodiment will be described in detail, here.

For example, assume a case where deceleration is carried out in a state where the shift lever 50 is in the D range, and the vehicle is stopped before the speed ratio Iva of the variator 20 reaches the Lowest speed ratio. In this case, since the Low brake 32 is in the engaged state and in a state where the driving wheels 7 not rotating and the variator 20 are connected through the Low brake 32, each of the pulleys 21 and 22 of the variator 20 is not rotated, and the speed ratio Iva of the variator 20 cannot be changed to the Lowest speed ratio. If the shift lever 50 is changed from the D range to the R range via the N range in this state, the Low brake 32 of the sub-transmission mechanism 30 is disengaged in accordance with a shift operation to the N range, and moreover, the Rev brake 34 is engaged in accordance with the shift operation to the R range. Here, during a period since the Low brake 32 is disengaged until the Rev brake 34 is engaged, all the friction engaging elements 32 to 34 of the sub-transmission mechanism 30 are in the disengaged state, and connection between the variator 20 and the driving wheels 7 is disengaged and thus, each of the pulleys 21 and 22 of the variator 20 can be rotated by the torque transmitted from the engine 1. In response to that, in the variator 20, control for changing the speed ratio Iva to the Lowest speed ratio during stop (hereinafter referred to as "Low return control") is executed.

This Low return control is control for suppressing a sense of discomfort given to the driver due to insufficient driving force of the vehicle at start after the stop. The Low return control is executed basically by discharging the hydraulic pressure from the primary pulley oil chamber 21a to lower the primary pulley pressure while the secondary pulley pressure is maintained. By increasing the secondary pulley pressure together with the lowering of the primary pulley pressure, the Low return control can be executed rapidly, but power consumption amount of the electric oil pump 10e is increased. In this embodiment, too, the Low return control is executed basically by lowering only the primary pulley pressure without increasing the secondary pulley pressure.

For the primary pulley pressure, a lowest hydraulic pressure Ppri_low is usually set so that the belt slip does not occur in the primary pulley 21 with respect to an increase of an engine torque Te caused by stepping-on of the accelerator pedal 51. Therefore, even when the Low return control is executed, the primary pulley pressure is controlled so as not to fall under the lowest hydraulic pressure Ppri_low.

However, by engaging the Rev brake 34 in the disengaged state (including a slip state where a substantial torque capacity is not generated) during execution of the Low return control, if the inertia torque is input from the sub-transmission mechanism 30 side to the variator 20, even if the primary pulley pressure is held at the lowest hydraulic pressure Ppri_low or more, a belt gripping force in the primary pulley 21 is not sufficient with respect to the input torque, and the belt slip can occur on the primary pulley 21.

If the shift lever 50 is operated to the N range and the Low brake 32 of the sub-transmission mechanism 30 is disengaged during stop, the rotation speed of the shaft of the Rev brake 34 on the driving wheels 7 side is still zero, the shaft of the Rev brake 34 on the variator 20 side is rotated together with the secondary pulley 22. As a result, in the Rev brake 34, a rotation speed difference according to a gear ratio in the Rev brake 34 occurs between the input and output shafts. If the Rev brake 34 is engaged in this state, a large inertia torque is input into the input shaft (shaft on the variator 20 side) of the Rev brake 34 from the driving wheels 7 side, and moreover, this inertia torque is input also to the variator 20.

As described above, when the inertia torque is input to the variator 20 also from the sub-transmission mechanism 30 side in addition to the torque input from the engine 1 side, the belt gripping force in the primary pulley 21 becomes insufficient, and the belt slip occurs.

Such belt slip occurs when the vehicle stops before the speed ratio Iva of the variator 20 reaches the Lowest speed ratio by sudden deceleration and moreover, when the shift lever 50 is operated from the D range to the R range via the N range after the stop or when it is operated from the R range to the D range via the N range.

However, the belt slip can occur not only during stop but also when the vehicle is suddenly decelerated and reaches an extremely low speed immediately before the stop and the shift lever 50 is changed from the D range to the R range via the N range before the speed ratio Iva of the variator 20 reaches a target speed ratio Ivt set on the Low side or when it is changed from the R range to the D range via the N range. That is, the belt slip becomes a problem when the speed ratio Iva of the variator 20 is still on the High side than the target speed ratio Ivt after deceleration or stop whether it is before or after the stop and can occur when the shift lever 50 is changed from the running range to the running range via the non-running range. The target speed ratio Ivt when the belt slip becomes a problem may be the Lowest speed ratio or a speed ratio smaller than the Lowest speed ratio.

Moreover, the belt slip can occur when the shift lever 50 is changed from the D range to the D range via the N range or from the R range to the R range via the N range. That is, the belt slip can occur not only in the case of operation between the different running ranges but also in the case of a change between the same running ranges via the non-running range. However, for example, though the shift lever 50 is operated from the D range to the N range, if it is returned to the D range in a short period, since the Low brake 32 is not disengaged by a remaining pressure, the rotation speed difference does not occur between the input and output shafts of the Low brake 32. That is, after the change from the running range to the non-running range, the remaining pressure of the friction engaging element on the disengaged side lowers and the rotation speed difference actually begins to emerge and then, if the shift lever 50 is returned from the non-running range to the same running range before the speed ratio Iva of the variator 20 reaches the target speed ratio Ivt set on the Low side, the belt slip can occur.

Figure 3:
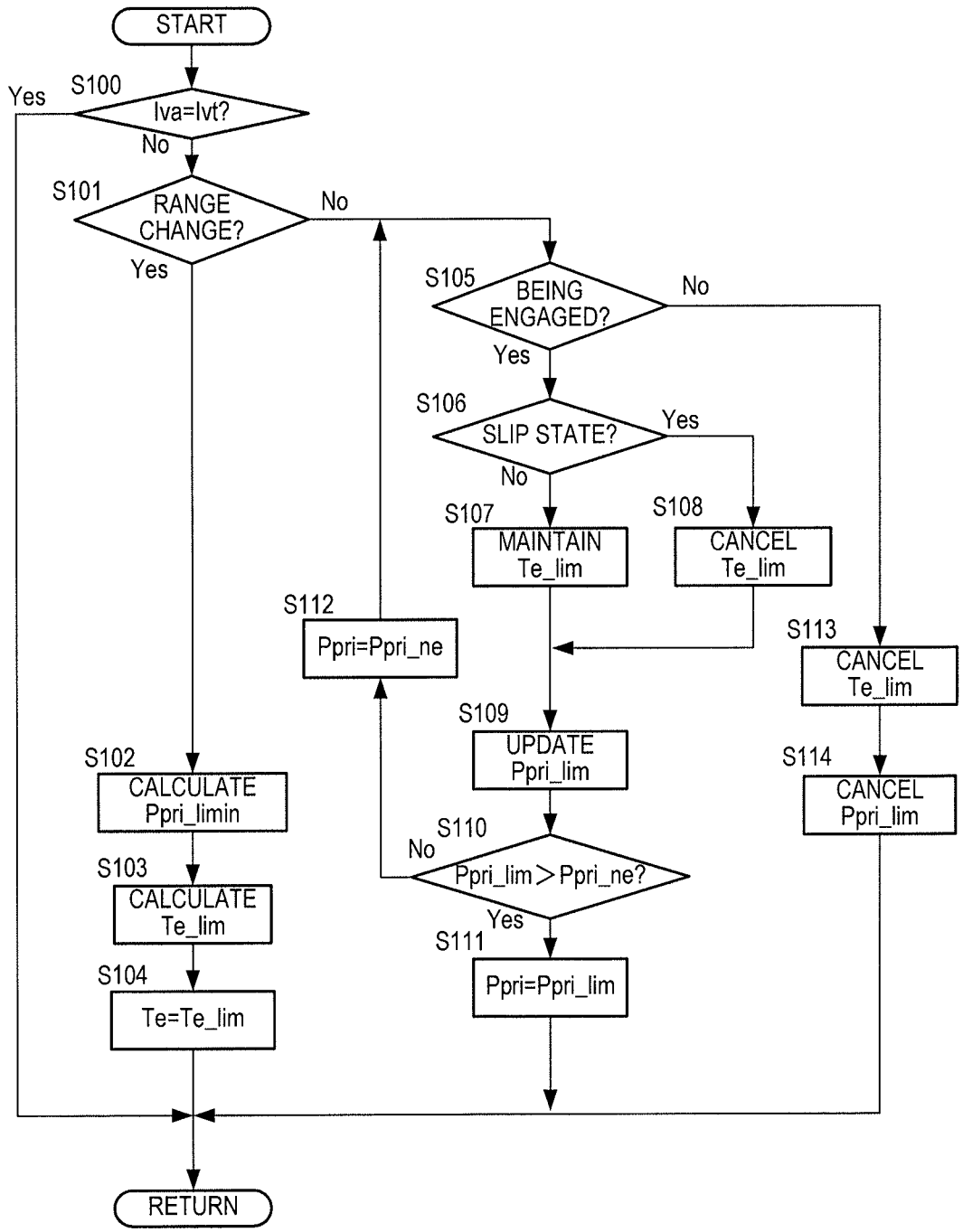
FIG. 3 is a flowchart illustrating contents of hydraulic control executed by the controller.

The hydraulic control according to this embodiment will be described below by referring to a flowchart illustrated in FIG. 3 by using a case where the shift lever 50 in the D range is operated to the R range via the N range after the stop as an example.

At Step S100, the controller 12 determines whether the speed ratio Iva of the variator 20 is the target speed ratio Ivt or not. In this embodiment, the target speed ratio Ivt is set to the Lowest speed ratio. The controller 12 calculates an actual speed ratio Iva of the variator 20 on the basis of signals from the primary rotation speed sensor 42 and the secondary rotation speed sensor 43 and determines whether the calculated actual speed ratio Iva is the target speed ratio Ivt or not. If the speed ratio Iva of the variator 20 is the target speed ratio Ivt, the processing this time is finished, while if it is not the target speed ratio Ivt, the processing proceeds to Step S101.

At Step S101, the controller 12 determines whether the shift lever 50 has been operated from the N range to the D range or the R range. If the shift lever 50 has been changed from the N range to the D range or the R range, the processing proceeds to Step S102, while if the shift lever 50 is held in the N range, the D range or the R range, the processing proceeds to Step S105. The controller 12 detects a position of the shift lever 50 on the basis of a signal from the inhibitor switch 45 and determines whether it has been operated to the D range or the R range by comparing the position with a detection result previous time. Therefore, if the shift lever 50 is operated from the D range to the R range via the N range, by means of the operation from the N range to the R range, the processing proceeds to Step S102. If the shift lever 50 has not been operated or held in the range after the operation, the processing proceeds to Step S105.

At Step S102, the controller 12 calculates an initial value Ppri_limin of a lower limit regulation value Ppri_lim of the primary pulley pressure. The initial value Ppri_limin of a lower limit regulation value Ppri_lim is set so that, if the primary pulley pressure is increased with a predetermined gradient ΔP, the primary pulley pressure reaches a predetermined pressure (predetermined oil pressure) P1 at a point of time when an engagement instruction to the Rev brake 34 is given and torque transmission is actually started at the Rev brake 34 (in other words, the torque capacity is generated) or before that. The predetermined gradient ΔP is a value set in advance, and if the increase of the primary pulley pressure is steep, there is a concern that the speed ratio Iva of the variator 20 is suddenly changed and it gives a sense of discomfort to the driver and thus, it is set to an appropriate value within a range not giving a sense of discomfort to the driver. The predetermined pressure P1 is a pressure calculated on the basis of a gear ratio of the Rev brake 34 to be engaged and the engine torque Te or the like in accordance with an operation state of the vehicle (the vehicle speed VSP, for example) and the operation of the shift lever 50 and is set so that the belt slip does not occur in the primary pulley 21 when the torque transmission is started in the Rev brake 34 and the inertia torque is input into the variator 20 from the sub-transmission mechanism 30 side.

The engagement control of the Rev brake 34 is managed by time from the operation of the shift lever 50, and when the shift lever 50 is operated, time until the torque transmission is started in the Rev brake 34 is determined. Therefore, the initial value Ppri_limin of the lower limit regulation value Ppri_lim can be calculated on the basis of the predetermined pressure P1, the predetermined gradient ΔP, and the time until the torque transmission is started.

Here, timing when the primary pulley pressure reaches the predetermined pressure P1 desirably matches the timing when the torque transmission is started in the Rev brake 34 and the initial value Ppri_limin is desirably calculated so that the both timings match. Moreover, the predetermined gradient ΔP may be set so that the primary pulley pressure reaches the predetermined pressure P1 when the both timings match or before the torque transmission is started in the Rev brake 34 after the initial value Ppri_limin is determined. That is, it is only necessary to set the initial value Ppri_limin or the predetermined gradient ΔP so that the primary pulley pressure reaches the predetermined pressure P1 by the time when the torque transmission is started at the latest.

At Step S103, the controller 12 calculates an upper limit value Te_lim of the engine torque Te. The upper limit value Te_lim of the engine torque Te is set by considering a case where the timing when the torque transmission is started in the Rev brake 34 becomes earlier than the set timing. The upper limit value Te_lim of the engine torque Te is a value obtained by subtracting a torque-down amount set in advance or the torque-down amount corresponding to the inertia torque input into the variator 20 by generation of the torque capacity by the Rev brake 34 from the current engine torque Te. The current engine torque Te is an engine torque in an idle state if the accelerator pedal 51 is not stepped on such as when the vehicle is stopped.

At Step S104, the controller 12 controls the engine 1 so that the engine torque Te becomes the upper limit value Te_lim of the engine torque Te.

At Step S105, the controller 12 determines whether the Rev brake 34 is being engaged or not. The controller 12 determines that engagement of the Rev brake 34 has been completed if the time since the shift lever 50 is operated to the R range reaches engagement completion time set in advance. The phrase "the engagement of the Rev brake 34 is completed" means that the hydraulic pressure supplied to the Rev brake 34 rises to a predetermined engagement pressure, and the Rev brake 34 comes to generate the predetermined torque capacity. If the engagement of the Rev brake 34 is not completed but is being engaged, the processing proceeds to Step S106, while if the engagement of the Rev brake 34 is completed, the processing proceeds to Step S113.

At Step S106, the controller 12 determines whether the torque transmission has been started in the Rev brake 34. That is, the controller 12 determines whether the Rev brake 34 is in a slip state or not. When the time from the operation of the shift lever 50 has reached slip start time set in advance, the controller 12 determines that the torque transmission has been started in the Rev brake 34. If the Rev brake 34 is not in the slip state and the torque transmission has not been started in the Rev brake 34, the processing proceeds to Step S107, while if the Rev brake 34 is in the slip state and the torque transmission has been started in the Rev brake 34, the processing proceeds to Step S108.

In this embodiment, since the initial value Ppri_limin is calculated so that the lower limit regulation value Ppri_lim becomes the predetermined pressure P1 at the point of time when the torque transmission is started in the Rev brake 34 or before that, if the Rev brake 34 enters the slip state, the lower limit regulation value Ppri_lim has become the predetermined pressure P1. Therefore, if the processing proceeds to Step S108, the lower limit regulation value Ppri_lim has become the predetermined pressure P1.

At Step S107, the controller 12 maintains the upper limit value Te_lim of the engine torque Te.

At Step S108, the controller 12 cancels the upper limit value Te_lim of the engine torque Te. After the upper limit value Te_lim is cancelled, the controller 12 gradually increases the engine torque Te from the upper limit value Te_lim.

As described above, by lowering the engine torque Te until the slip start time has elapsed after the operation of the shift lever 50, even if actual time from the operation of the shift lever 50 until the torque transmission is started in the Rev brake 34 is shorter than the slip start time and the Rev brake 34 generates the torque capacity before elapse of the slip start time, the belt slip in the primary pulley 21 can be suppressed.

At Step S109, the controller 12 updates the lower limit regulation value Ppri_lim by adding a predetermined addition value P2 to the current lower limit regulation value Ppri_lim. The predetermined addition value P2 is a value set in advance so that the lower limit regulation value Ppri_lim increases by the predetermined gradient ΔP. The lower limit regulation value Ppri_lim is held at the predetermined pressure P1 after the primary pulley pressure becomes the predetermined pressure P1.

At Step S110, the controller 12 compares the updated lower limit regulation value Ppri_lim with a required pressure Ppri_ne of the primary pulley 21. The required pressure Ppri_ne is set to the higher hydraulic pressure in a hydraulic pressure calculated on the basis of the target speed ratio Ivt in order to change the speed ratio Iva of the variator 20 to the target speed ratio Ivt (Lowest speed ratio) and a lowest hydraulic pressure Ppri_low not generating the belt slip in the primary pulley 21 with respect to the torque transmitted from the engine 1. If the current lower limit regulation value Ppri_lim is higher than the required pressure Ppri_ne, the processing proceeds to Step S111, while if the current lower limit regulation value Ppri_lim is not higher than the required pressure Ppri_ne, the processing proceeds to Step S112.

At Step S111, the controller 12 sets an instructed pressure (target hydraulic pressure) Ppri of the primary pulley 21 to the lower limit regulation value Ppri_lim. As a result, the primary pulley pressure is controlled on the basis of the lower limit regulation value Ppri_lim.

At Step S112, the controller 12 sets the instructed pressure Ppri of the primary pulley 21 to the required pressure Ppri_ne. As a result, the primary pulley pressure is controlled on the basis of the required pressure Ppri_ne.

As described above, if the lower limit regulation value Ppri_lim exceeds the required pressure Ppri_ne, the instructed pressure Ppri of the primary pulley 21 is set to the lower limit regulation value Ppri_lim, and the subsequent lowering of the instructed pressure value Ppri is regulated. As a result, the speed ratio Iva of the variator 20 is controlled toward the Lowest speed ratio, and a state where the primary pulley pressure is too low when the Rev brake 34 is engaged is prevented, and occurrence of the belt slip in the primary pulley 21 can be suppressed.

When the instructed pressure Ppri of the primary pulley 21 is set to the lower limit regulation value Ppri_lim, the speed ratio Iva of the variator 20 can be brought closer to the Lowest speed ratio by increasing an instructed pressure Psec of the secondary pulley 22. As described above, shifting of the variator 20 and suppression of the belt slip can be both realized.

At Step S113, the controller 12 cancels the upper limit value Te_lim of the engine torque Te. After the cancellation, the controller 12 increases the engine torque Te from the upper limit value Te_lim in a stepped manner.

At Step S114, the controller 12 cancels the lower limit regulation value Ppri_lim. As a result, the required pressure Ppri_ne is set to the instructed pressure Ppri of the primary pulley 21, and the primary pulley pressure is controlled on the basis of the required pressure Ppri_ne.

Figure 4:
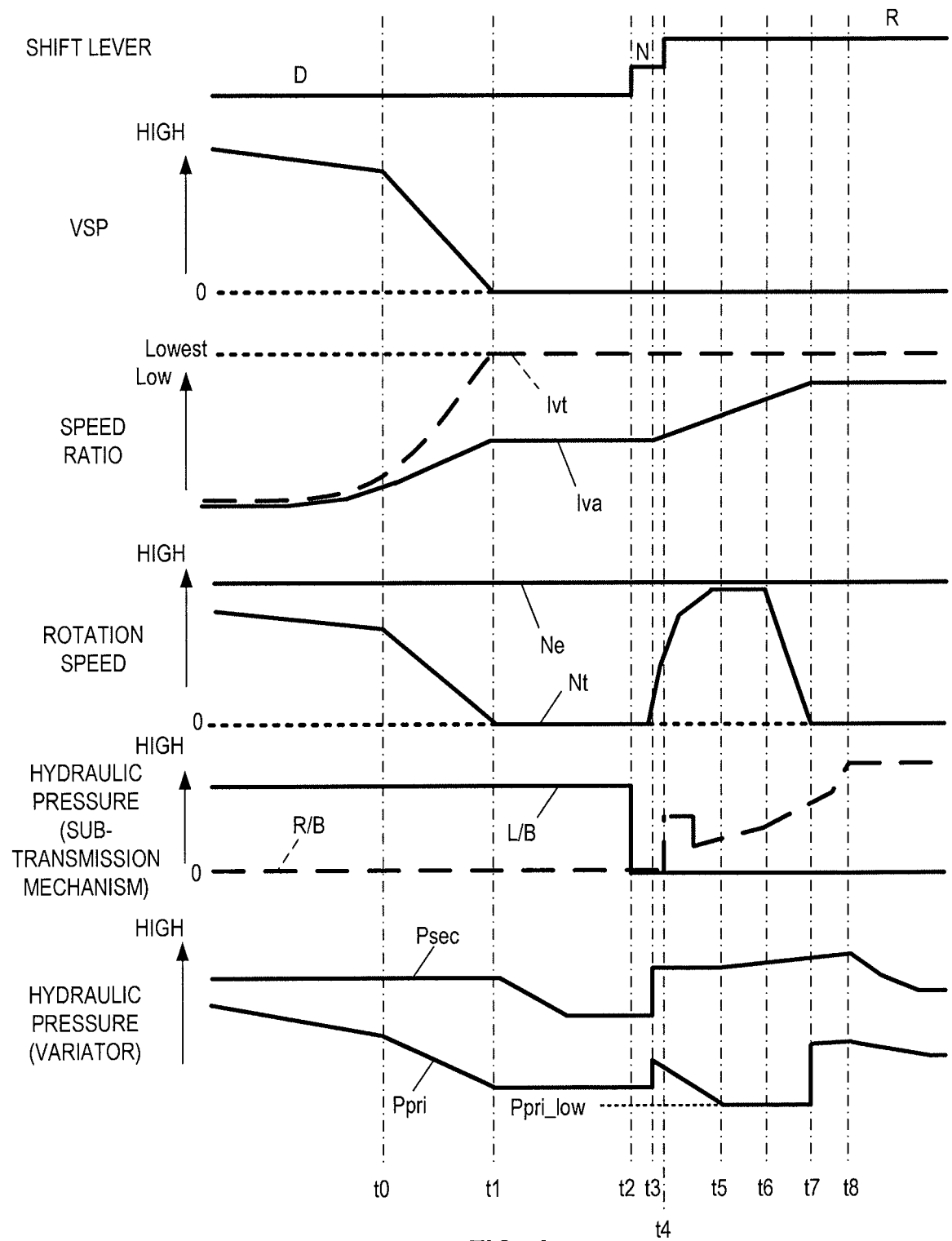
FIG. 4 is a time chart illustrating an operation of the entire vehicle when the hydraulic control is not used.
Figure 5:
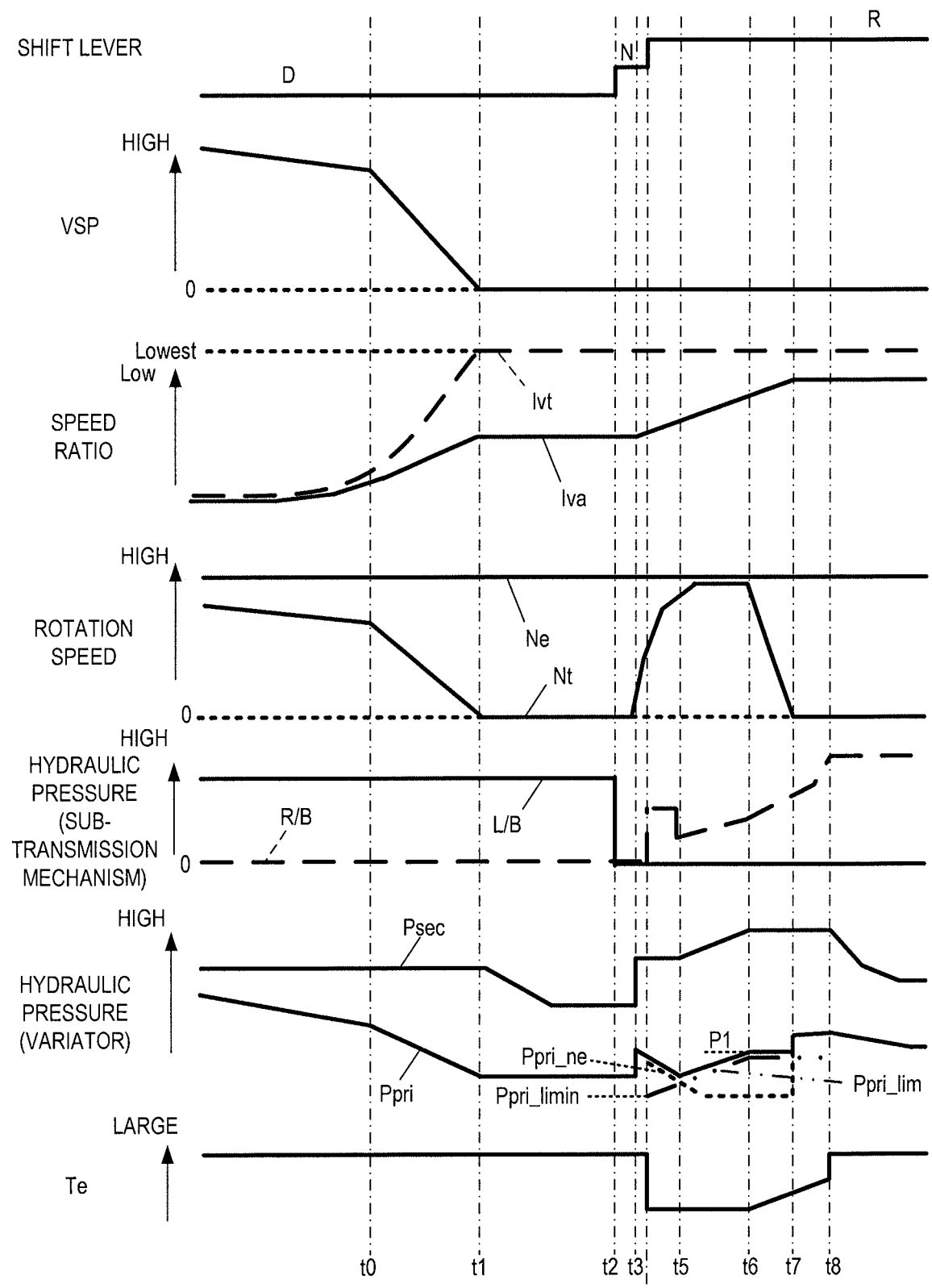
FIG. 5 is a time chart illustrating the operation of the entire vehicle when lowering of a hydraulic pressure is regulated by the hydraulic control.

Subsequently, the hydraulic control according to this embodiment will be described by referring to a time chart. FIG. 4 is a time chart when the hydraulic control according to this embodiment is not executed and lowering of the primary pulley pressure is not regulated. FIG. 5 is a time chart when the hydraulic control according to this embodiment is executed.

First, the case where the hydraulic control of this embodiment is not executed will be described by referring to FIG. 4.

At time t0, the vehicle suddenly decelerates, and the vehicle speed VSP lowers. Here, the Low brake 32 is engaged, while the lockup clutch 2c is disengaged, and the turbine rotation speed Nt lowers together with the lowering of the vehicle speed VSP. With the lowering of the vehicle speed VSP, the target speed ratio Ivt of the variator 20 is changed toward the Lowest speed ratio, and down-shift according to a deviation of the actual speed ratio Iva of the variator 20 to the target speed ratio Ivt is carried out. As a result, the instructed pressure Ppri of the primary pulley 21 is lowered, and the speed ratio Iva of the variator 20 is changed to the Low side.

At time t1, the vehicle is stopped, and the vehicle speed VSP becomes 0 (zero). Here, the target speed ratio Ivt is set to the Lowest speed ratio, but shifting of the actual speed ratio Iva of the variator 20 cannot catch up with the rapid deceleration and has not reached the Lowest speed ratio. Since each of the pulleys 21 and 22 of the variator 20 is not rotated, the speed ratio Iva of the variator 20 is held at a value during stop. Since the shift lever 50 is in the D range, the Low brake 32 is engaged, and the turbine rotation speed Nt also becomes zero. Due to the stop, the secondary pulley pressure required for preventing the belt slip becomes smaller and thus, the instructed pressure Psec of the secondary pulley lowers.

From time t2 to time t4, the shift lever 50 is operated from the D range to the R range via the N range. At the time t2, the shift lever 50 is operated from the D range to the N range, and at the time t4, the shift lever 50 in the N range is operated to the R range.

By means of operation of the shift lever 50 to the N range at the time t2, the Low brake 32 of the sub-transmission mechanism 30 is disengaged. By means of disengagement of the Low brake 32, the rotation elements closer to the engine 1 side than the Low brake 32 are made capable of free rotation. Thus, the rotation elements such as the pulleys 21 and 22 are rotated by the torque transmitted from the engine 1, and at the time t3, the turbine rotation speed Nt starts rising.

Moreover, since the Low brake 32 is disengaged, the torque is transmitted from the engine 1, and each of the pulleys 21 and 22 of the variator 20 is rotated, the speed ratio Iva of the variator 20 is made changeable. Thus, the instructed pressure Psec of the secondary pulley 22 is increased in a stepped manner. The instructed pressure Psec of the secondary pulley 22 is increased in the stepped manner as described above and the instructed pressure Ppri of the primary pulley 21 is also increased in accordance with the increase of the secondary pulley pressure Psec to suppress the rapid change of the speed ratio Iva. After that, by lowering the instructed pressure Ppri of the primary pulley 21, the speed ratio Iva is changed to the Low side.

At the time t4, when the shift lever 50 is operated to the R range, pre-charging to the Rev brake 34 is started. The pre-charging is, concerning the Rev brake 34, an operation of rapidly changing to a state immediately before the torque capacity is generated in the Rev brake 34 by increasing the hydraulic pressure to be supplied to the Rev brake 34 in the stepped manner.

At the time t5, when the instructed pressure Ppri of the primary pulley 21 reaches the lowest hydraulic pressure Ppri_low at which the belt slip does not occur in the primary pulley 21 with respect to the torque transmitted from the engine 1, the instructed pressure Ppri of the primary pulley 21 is held at this lowest hydraulic pressure Ppri_low. After the instructed pressure Ppri of the primary pulley 21 is held at the lowest hydraulic pressure Ppri_low, by raising the instructed pressure Psec of the secondary pulley 22, the speed ratio Iva of the variator 20 is changed to the Low side.

At time t6, when the pre-charging of the Rev brake 34 is finished, the torque capacity is generated in the Rev brake 34, and torque transmission through the Rev brake 34 is started. As a result, the inertia torque is input to the variator 20 from the sub-transmission mechanism 30 side, and the turbine rotation speed Nt lowers.

If the hydraulic control according to this embodiment is not executed, the lowest hydraulic pressure Ppri_low is set so that the belt slip does not occur in the variator 20 with respect to the torque input from the engine 1, but the fact that the shift lever 50 is operated from the D range to the R range, and the inertia torque is input from the sub-transmission mechanism 30 side is not considered. Thus, by means of the input of the inertia torque, the belt gripping force becomes insufficient, and there is a concern that the belt slip occurs in the variator 20.

At time t7, engagement of the Rev brake 34 progresses, and when the rotation of each of the pulleys 21 and 22 is stopped in the variator 20, shifting of the variator 20 can be no longer carried out and thus, the speed ratio Iva is held at a value at a point of time when the rotation is stopped. In order to hold the speed ratio Iva, the instructed pressure Ppri of the primary pulley 21 is increased.

At time t8, the engagement of the Rev brake 34 is completed.

Subsequently, the case where the hydraulic control according to this embodiment is executed will be described by referring to FIG. 5.

From the time t0 to the time t2 is the same as FIG. 4, and description here will be omitted.

From the time t2 to the time t4, the shift lever 50 is operated from the D range to the R range via the N range. At the time t2, the shift lever 50 is operated form the D range to the N range, and at the time t4, it is operated from the N range to the R range.

At the time t2, by means of the operation of the shift lever 50 to the N range, the Low brake 32 is disengaged, and at the time t3, the turbine rotation speed Nt is raised.

Moreover, by means of the disengagement of the Low brake 34, the speed ratio Iva is made changeable in the variator 20, and after the turbine rotation speed Nt starts rising, the down-shift toward the Lowest speed ratio of the variator 20 is resumed.

At the time t4, when the shift lever 50 is operated to the R range, the pre-charging to the Rev brake 34 is started. Moreover, in response to the operation to the R range, the initial value Ppri_limin of the lower limit regulation value Ppri_lim is calculated. At the time t4, since the required pressure Ppri_ne of the primary pulley 21 is higher than the lower limit regulation value Ppri_lim, the required pressure Ppri_ne of the primary pulley 21 is set to the instructed pressure Ppri of the primary pulley 21. In FIG. 5, the required pressure Ppri_ne of the primary pulley 21 at the time t4 and after is indicated by a dot line, and the lower limit regulation value Ppri_lim is indicated by a two-dot chain line. Moreover, the upper limit value Te_lim of the engine torque Te is calculated, and by setting the engine torque Te to the upper limit value Te_lim, the engine torque Te lowers.

At the time t5, when the lower limit regulation value Ppri_lim becomes higher than the required pressure Ppri_ne, the lower limit regulation value Ppri_lim is set to the instructed pressure Ppri of the primary pulley 21, and the instructed pressure Ppri of the primary pulley 21 becomes higher than the case where the required pressure Ppri_ne is set. In this embodiment, if there is no operation to the R range, the required pressure Ppri_ne is continuously set to the instructed pressure Ppri of the primary pulley 21 at the time t5 and after. Since the primary pulley pressure becomes high by selecting the lower limit regulation value Ppri_lim, the instructed pressure Psec of the secondary pulley 22 is also made high, and since an actual pressure of each of the pulleys 21 and 22 is changed on the basis of these instructed pressures Ppri and Psec, the change of the speed ratio Iva toward the Lowest speed ratio is continued at the time t5 and after.

At the time t6, the pre-charging of the Rev brake 34 is finished, and the Rev brake 34 starts torque transmission. As already described, by means of the setting of the initial value Ppri_limin or the like, at the time t6, the lower limit regulation value Ppri_lim has reached the predetermined pressure P1. At this point of time, the inertia toque is input into the variator 20 from the sub-transmission mechanism 30 side, but when the hydraulic control according to this embodiment is executed, the instructed pressure Ppri of the primary pulley 21 is high since it is set to the lower limit regulation value Ppri_lim (=P1), and thus, even if the inertia torque is input, the belt gripping force does not run short, and the belt slip does not occur on the primary pulley 21. Moreover, the upper limit value Te_lim of the engine torque Te is cancelled, and the engine torque Te is gradually increased. At the time t6 and after, the instructed pressure Ppri of the primary pulley 21 is held at the predetermined pressure P1.

At the time t7, when the engagement of the Rev brake 34 progresses, and the turbine rotation speed Nt becomes zero, the speed ratio Iva is held at a value at that point of time. In this embodiment, the required pressure Ppri_ne is increased in order to hold the speed ratio Iva. Since the required pressure Ppri_ne becomes higher than the lower limit regulation value Ppri_lim, the required pressure Ppri_ne is set to the instructed pressure Ppri of the primary pulley 21.

At the time t8, when the engagement of the Rev brake 34 is completed, the lower limit regulation value Ppri_lim is cancelled. Moreover, the upper limit value Te_lim of the engine torque Te is cancelled.

In this embodiment, the lower limit regulation value Ppri_lim is increased from the initial value Ppri_limin by the predetermined gradient ΔP, but the initial value Ppri_limin may be set to the predetermined pressure P1 at the same time as when the shift lever 50 is operated from the N range to the R range.

The lower limit regulation value Ppri_lim is compared with the required pressure Ppri_ne, and the higher one is set to the instructed pressure Ppri of the primary pulley 21 and thus, when the instructed pressure Ppri of the primary pulley 21 is switched from the required pressure Ppri_ne to the lower limit regulation value Ppri_lim, a change of the actual pressure of the primary pulley 21 is switched from lowering to increase, whereby under-chute can occur in the actual pressure.

On the other hand, as a variation, by setting the lower limit regulation value Ppri_lim of the primary pulley 21 to the predetermined pressure P1 at the same time as when the operation to the R range, the lower limit regulation value Ppri_lim can be made higher than the required pressure Ppri_ne at the same time as the operation to the R range. Thus, the under-chute which occurs when the instructed pressure Ppri of the primary pulley 21 is switched from the required pressure Ppri_ne to the lower limit regulation value Ppri_lim can be suppressed.

Control of the aforementioned variation can be easily realized by setting the initial value Ppri_limin of the lower limit regulation value Ppri_lim to the predetermined pressure P1. Since the under-chute is suppressed, the belt gripping force is prevented from being insufficient reliably when the torque transmission is started in the Rev brake 34.

Even if the hydraulic control of the aforementioned variation is to be executed, when the predetermined pressure P1 is higher than the instructed pressure Ppri of the primary pulley 21 at a point of time when the shift lever 50 is put in the R range (the instructed pressure Ppri at the time t4 in FIG. 5), the lower limit regulation value Ppri_lim may be increased from the initial value Ppri_limin larger than the instructed pressure Ppri at that point of time by the predetermined gradient LP. As a result, the instructed pressure Ppri of the primary pulley 21 becomes excessively high, and shifting of the variator 20 to the High side can be prevented.

Moreover, as another variation, lowering of the primary pulley pressure after the operation may be prohibited by holding the primary pulley pressure at a point of time when the shift lever 50 is operated to the R range. Such control can realize an increase of the lower limit regulation value Ppri_lim from the initial value Ppri_limin after the operation to the R range, while the required pressure Ppri_ne of the primary pulley 21 is held. If the required pressure Ppri_ne is not smaller than the predetermined pressure P1, the required pressure Ppri_ne is set to the instructed pressure Ppri of the primary pulley 21 at all times. If the required pressure Ppri_ne is lower than the predetermined pressure P1, the lower limit regulation value Ppri_lim increases, and when it becomes higher than the required pressure Ppri_ne, the lower limit regulation value Ppri_lim is set to the instructed pressure Ppri of the primary pulley 21. By means of such control, too, when the instructed pressure Ppri of the primary pulley 21 is switched from the required pressure Ppri_ne to the lower limit regulation value Ppri_lim, the actual pressure of the primary pulley 21 is only increased from a certain state and thus, the under-chute can be suppressed as compared with the case of an increase from the lowered state, and when the torque transmission is started in the Rev brake 34, running short of the belt gripping force can be suppressed.

Even if the hydraulic control of another variation is executed, by making the instructed pressure Psec of the secondary pulley 22 higher, the speed ratio Iva of the variator 20 can be controlled toward the target speed ratio Ivt.

Effects obtained by this embodiment will be described below.

In the vehicle in which the sub-transmission mechanism 30 is provided between the variator 20 and the driving wheels 7, when the speed ratio Iva of the variator 20 has not reached the target speed ratio Ivt (Lowest speed ratio) and still in the High side state, if the shift lever 50 is operated from the D range to the R range, lowering of the instructed pressure Ppri of the primary pulley 21 after the switching to the R range is regulated. As a result, running short of the belt gripping force in the variator 20 is suppressed, the torque transmission is started in the Rev brake 34, and even if the inertia torque is input into the variator 20, occurrence of the belt slip on the primary pulley 21 can be suppressed.

When the torque transmission is started in the Rev brake 34 and the inertia torque is input into the variator 20, by setting the instructed pressure Ppri of the primary pulley 21 to the lower limit regulation value Ppri_lim higher than the required pressure Ppri_ne, the belt gripping force by the primary pulley 21 is ensured, and occurrence of the belt slip on the primary pulley 21 can be suppressed.

By setting the predetermined pressure P at which the belt slip does not occur in the primary pulley 21 with respect to the input of the inertia torque from the sub-transmission mechanism 30 side, and by increasing the lower limit regulation value Ppri_lim to this predetermined pressure P1 after the switching from the non-running range to the running range (the R range, for example), the torque transmission is started in the Rev brake 34, and even if the inertia torque is input into the variator 20, occurrence of the belt slip on the primary pulley 21 can be suppressed.

By setting the lower limit regulation value Ppri_lim to increase the primary pulley pressure so that the primary pulley pressure reaches the predetermined pressure P1 by the time a torque capacity is generated in the Rev brake 34 and the torque transmission is started in the Rev brake 34 at the latest, occurrence of the belt slip on the primary pulley 21 can be suppressed more reliably.

Moreover, even if the shift lever 50 is operated not only during the stop but also between the running ranges (the R range and the D range, for example), the belt slip on the primary pulley 21 can be similarly suppressed. The operation of the shift lever 50 is not limited to the operation between the same running range but may be an operation between different running ranges. For example, it may be a case where the shift lever 50 is operated from the D range to the D range via the N range, and after the rotation speed difference is generated between the input and output shafts of the Low brake 32 due to the lowering of the hydraulic pressure of the Low brake 32, the shift lever 50 is returned to the D range, and the belt slip on the primary pulley 21 can be similarly suppressed. As described above, in the case where the shift lever 50 is operated from the running range to the running range via the non-running range and the speed ratio Iva of the variator 20 is changed to the Low side in conjunction with the operation to the non-running range in general, the belt slip on the primary pulley 21 can be suppressed.

In the aforementioned description, the engine 1 is used as a driving source of the vehicle, but an electric motor may be used instead of the engine 1, and an internal combustion engine and the electric motor may be used in combination. The electric motor may have only a function as a generator or may be a motor generator serving both the functions of the generator and a power generator.

Moreover, the vehicle to which the present invention is applied may be a vehicle including a forward/reverse switching mechanism instead of the sub-transmission mechanism 30.

The embodiment of the present invention has been described, but the aforementioned embodiment is only exemplification of a part of an application example of the present invention and is not intended to limit the technical range of the present invention to a specific constitution of the aforementioned embodiment.

The present application claims a priority of Japanese Patent Application No. 2015-178428 filed with the Japan Patent Office on Sep. 10, 2015, all the contents of which are hereby incorporated by reference.

The invention claimed is:

1. A vehicle control device adapted to control a vehicle including:
    a variator provided in a power transmission path between a driving source and a driving wheel of a vehicle;
    a friction engaging element provided between the variator and the driving wheel, engaged when a running range is selected, while disengaged when a non-running range is selected and shutting off transmission of power through the power transmission path, and
    a controller configured to
        detect an operating state of the vehicle;
        set a target speed ratio of the variator according to the operating state of the vehicle;
        when an actual speed ratio of the variator is smaller than the target speed ratio, execute shifting control of lowering a supply hydraulic pressure to a primary pulley of the variator and increasing the speed ratio of the variator is executed; and
        when the shifting range is switched from the non-running range to the running range during execution of the shifting control, regulate lowering of the supply hydraulic pressure to the primary pulley after the switching.

2. The vehicle control device according to claim 1, wherein
    the controller is configured to regulate lowering of the supply hydraulic pressure during stop of the vehicle.

3. The vehicle control device according to claim 1, wherein the target speed ratio set during the stop is the lowest speed ratio set in advance for the variator.

4. The vehicle control device according to claim 1, wherein
    the controller is configured to increase a supply hydraulic pressure to the primary pulley at a point of time when a torque capacity is generated in the friction engaging element by switching to the running range more than the supply hydraulic pressure set for the primary pulley in the shifting control when there is no switching to the running range.

5. The vehicle control device according to claim 4, wherein
    a supply hydraulic pressure to the primary pulley at a point of time when the torque capacity is generated is set to a predetermined pressure at which the belt slip does not occur in the variator with respect to the torque input to the variator by engagement of the friction engaging element.

6. The vehicle control device according to claim 5, wherein
    the controller is configured to increase the supply hydraulic pressure gradually so that the supply hydraulic pressure reaches the predetermined hydraulic pressure by a point of time when the torque capacity is generated in the friction engaging element after switching to the running range at the latest.

7. The vehicle control device according to claim 5, wherein
    the supply hydraulic pressure is set to the predetermined pressure at the same time as switching to the running range.

8. The vehicle control device according to claim 1, wherein
    the controller is configured to prohibit lowering of a supply hydraulic pressure to the primary pulley after the switching.

9. The vehicle control device according to claim 1, in which the friction engaging element includes a first friction engaging element engaged when a forward running range is selected and a second friction engaging element engaged when a reverse running range is selected, wherein
    when a shifting range is switched from the non-running range to the forward running range or to the reverse running range during execution of the shifting control, the controller prohibits lowering of the supply hydraulic pressure after the switching.

10. The vehicle control device according to claim 1, wherein
    in a shift operation between the same running range via the non-running range, when a shifting range is switched from the non-running range to the running range during execution of the shifting control, the controller regulates lowering of the supply hydraulic pressure after the switching.

11. A vehicle control method for a vehicle including:
    a variator provided in a power transmission path between a driving source and a driving wheel of the vehicle; and
    a friction engaging element provided between the variator and the driving wheel, engaged when a running range is selected, while disengaged when a non-running range is selected and shutting off transmission of power through the power transmission path, the vehicle control method comprising
    detecting an operating state of the vehicle;
    setting a target speed ratio of the variator according to the operating state of the vehicle;
    when an actual speed ratio of the variator is smaller than the target speed ratio, executing shifting control of lowering a supply hydraulic pressure to a primary pulley of the variator and increasing the speed ratio of the variator; and
    when the shifting range is switched from the non-running range to the running range during execution of the shifting control, regulating lowering of the supply hydraulic pressure to the primary pulley after the switching.

* * * * *